(12) United States Patent
Lin

(10) Patent No.: US 6,246,579 B1
(45) Date of Patent: Jun. 12, 2001

(54) HARD DISKDRIVE COOLING STRUCTURE

(75) Inventor: Shih-Jen Lin, Taipei (TW)

(73) Assignee: Global WIN Technology Co., Ltd., Taipei (TW)

( * ) Notice: Subject to any disclaimer, the term of this patent is extended or adjusted under 35 U.S.C. 154(b) by 0 days.

(21) Appl. No.: 09/206,231

(22) Filed: Dec. 7, 1998

(30) Foreign Application Priority Data

Dec. 31, 1997 (TW) ................................................ 86221787

(51) Int. Cl.[7] ...................................................... H05K 7/20
(52) U.S. Cl. ........................ 361/695; 361/685; 361/687; 361/727; 165/122; 312/107
(58) Field of Search ................................ 361/683, 684, 361/685, 667, 694, 695, 724, 732; 307/53; 312/223.2; 340/584; 165/122, 247, 908; 454/184; 364/708.1

(56) References Cited

U.S. PATENT DOCUMENTS

| | | | |
|---|---|---|---|
| 4,296,455 | * 10/1981 | Leaycraft et al. ................... | 361/383 |
| 4,644,443 | * 2/1987 | Swensen et al. ..................... | 361/384 |
| 4,754,397 | * 6/1988 | Varaiya et al. ...................... | 364/200 |
| 5,171,183 | * 12/1992 | Pollard et al. ....................... | 454/184 |
| 5,412,534 | * 5/1995 | Cutts et al. .......................... | 361/695 |
| 5,493,457 | * 2/1996 | Kawamura et al. ................. | 369/75.1 |
| 5,761,032 | * 6/1998 | Jones ................................... | 361/685 |
| 5,772,500 | * 6/1998 | Harvey et al. ....................... | 454/184 |

* cited by examiner

Primary Examiner—Leo P. Picard
Assistant Examiner—Michael Datskovsky
(74) Attorney, Agent, or Firm—Robert E. Bushnell, Esq.

(57) ABSTRACT

A hard diskdrive cooling structure includes a rack installed in a computer to hold a hard diskdrive, the rack having an open chamber, which holds a fan motor and an axial-flow fan being coupled to the fan motor, and air vents in communication with the open chamber, a wire gauze filter covered over the air vents at the rack, and a fan guard covered on the open chamber of the rack, the fan guard having air vents in communication with the air vents at the rack and flow guide means for guiding currents of air from the air vents toward the hard diskdrive carried on the rack.

28 Claims, 5 Drawing Sheets

HARD DISKDRIVE COOLING STRUCTURE

BACKGROUND OF THE INVENTION

The present invention relates to an electronic component e.g., a hard disk drive cooling structure for use in a computer to dissipate heat from a hard disk drive, for example, installed therein, and more particularly to such a hard diskdrive cooling structure which achieves high cooling efficiency and, is inexpensive to manufacture.

When a computer is operated, heat must be quickly carried away from important parts of the computer such as a CPU (central processing unit), hard disk drive, etc. The working temperature of a hard disk drive is within about 5~55° C. When the working temperature surpasses 55° C., the hard disk drive may become unable to function well, and stored data may be destroyed. In order to maintain the optimum working temperature for a hard disk drive, a cooling arrangement is needed. FIG. 6 shows the arrangement of an earlier hard disk drive cooling structure. According to this design, a plurality of fans 70 are provided adjacent to the hard disk drive 60. When the computer is started, the fans 70 are operated to blow currents of air toward the hard disk drive 60. Because the fans 70 are installed in the computer at one lateral side, currents of air are directly blown toward the front side of the hard disk drive 60, causing a high wind resistance force to be produced; in consequence, thereof the cooling efficiency is low. Further, due to the size limitation of 42 mm x 149 mm, only three fans of size 40 mm x 40 mm can be installed. Because three fans are installed, the installation cost is high.

SUMMARY OF THE INVENTION

It is one object of the present invention to provide an electronic component, e.g., a hard disk drive cooling structure which achieves high cooling efficiency.

It is another object of the present invention to provide a hard disk drive cooling structure which is inexpensive to manufacture.

It is still another object of the present invention to provide a hard disk drive cooling structure which can be alternatively installed between two positions to blow cooling air toward the top side or bottom side of the hard disk drive as desired.

According to one aspect of the present invention, the hard disk drive cooling structure comprises a rack installed in a computer to hold a hard disk drive, the rack having an open chamber, which holds a fan motor and a tangential flow fan coupled to the fan motor, and air vents in communication with the open chamber, a wire gauze filter covering the air vents of the rack, and a fan guard covering the open chamber of the rack, the fan guard having air vents in communication with the air vents of the rack and a flow guide for guiding currents of air from the air vents toward the hard disk drive carried on the rack.

According to another aspect of the present invention, the rack can be installed in the computer between a first position where the air vents of the fan guard are disposed at the top side for guiding currents of air into the open chamber of the rack from the top side, or a second position where the air vents of the fan guard are disposed at the bottom side for guiding currents of air into the open chamber of the rack from the bottom side.

DETAILED DESCRIPTION OF THE PREFERRED EMBODIMENT

Figure 1:
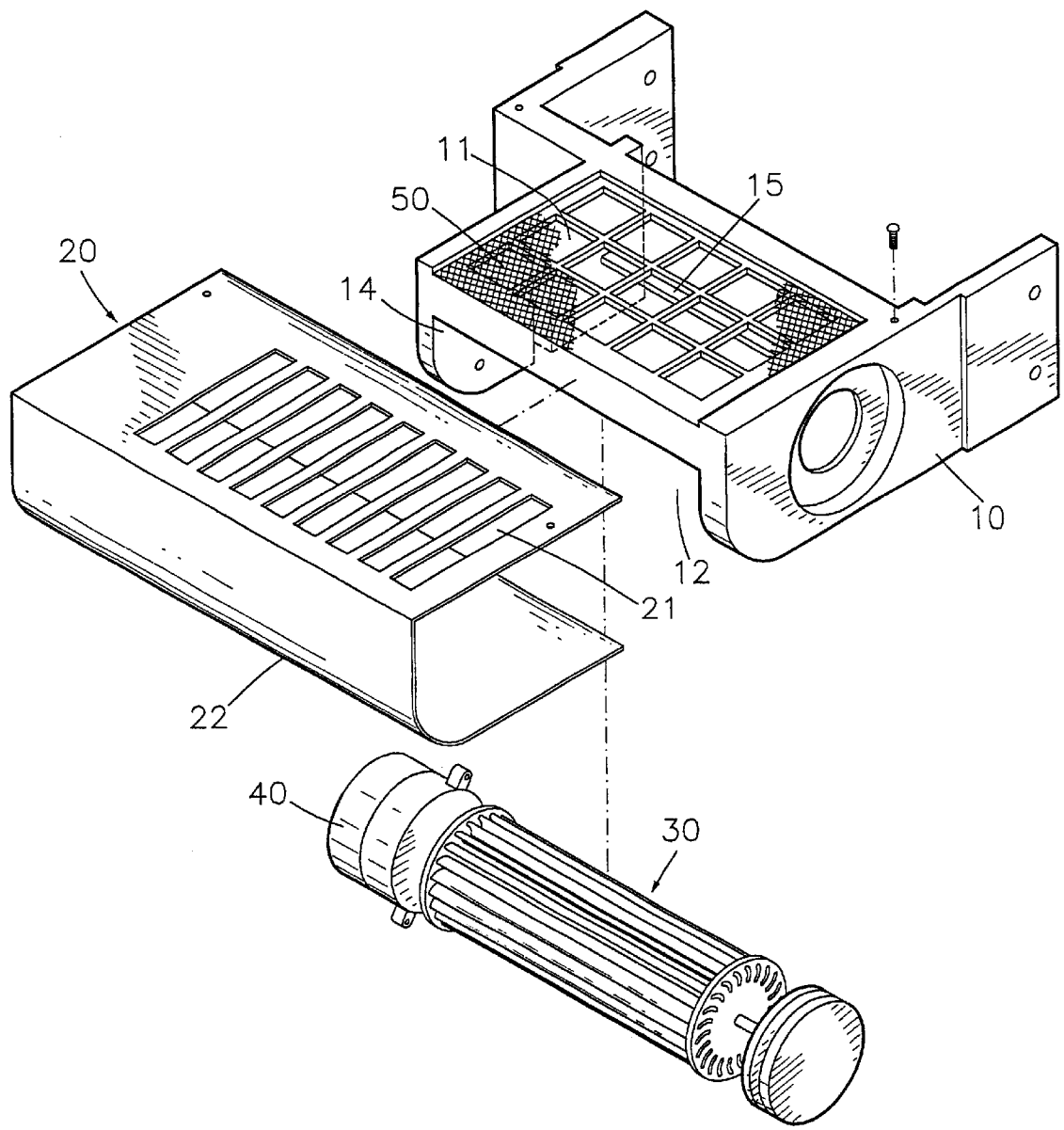
FIG. 1 is an exploded view of a hard disk drive cooling structure according to one embodiment of the present invention.
Figure 2:
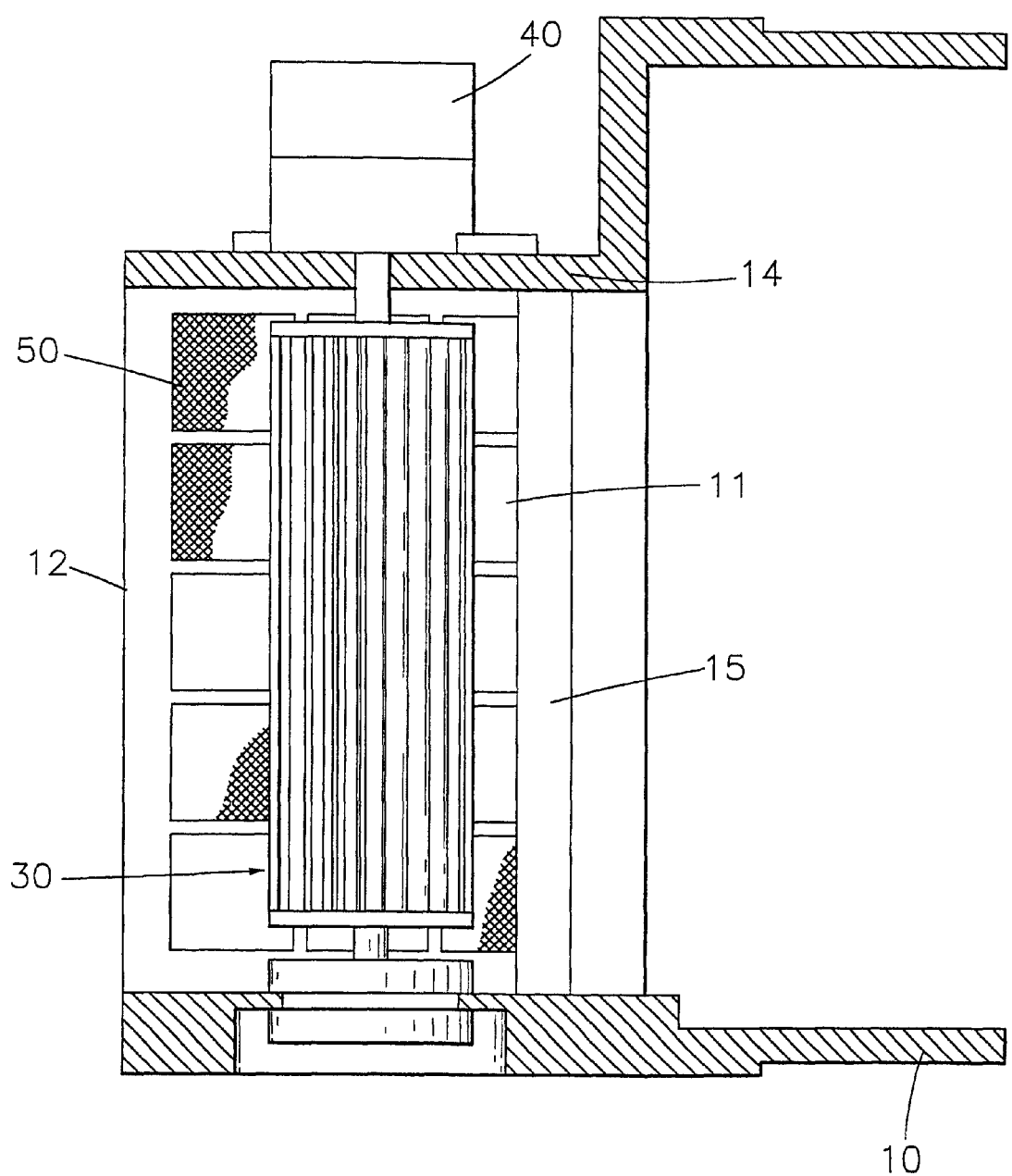
FIG. 2 is a bottom plain view of the hard disk drive cooling structure shown in FIG. 1.

Referring to FIGS. 1 and 2, a hard disk drive cooling structure in accordance with the present invention is generally comprised of a rack 10, a flow guide 15, a fan guard 20, a tangential flow fan 30, a fan motor 40, and a wire gauze filter 50.

The rack 10 is installed in a computer to hold a hard disk drive (not shown), having a plurality of air vents 11, and two parallel side walls 14 defining a bottom chamber 12. The flow guide 15 is mounted in the rack 10 to guide air into the rack 10 smoothly. The wire gauze filter 50 is mounted in the rack 10 and covers the air vents 11 to remove solid matter from air passing through the air vents 11. The fan motor 40 is installed in one side wall 14 of the rack 10. The tangential flow fan 30 is installed in the bottom chamber 12 of the rack 10, and coupled to the fan motor 40. The fan guard 20 is covers on the rack 10 over the wire gauze filter 50, and has a plurality of air vents 21 corresponding to the air vents 11 at the rack 10, and a smoothly curved flow guide panel 22 covering over the front and bottom sides of the bottom chamber 12 of the rack 10 to protect the fan motor 40 and the tangential flow fan 30.

Figure 3:
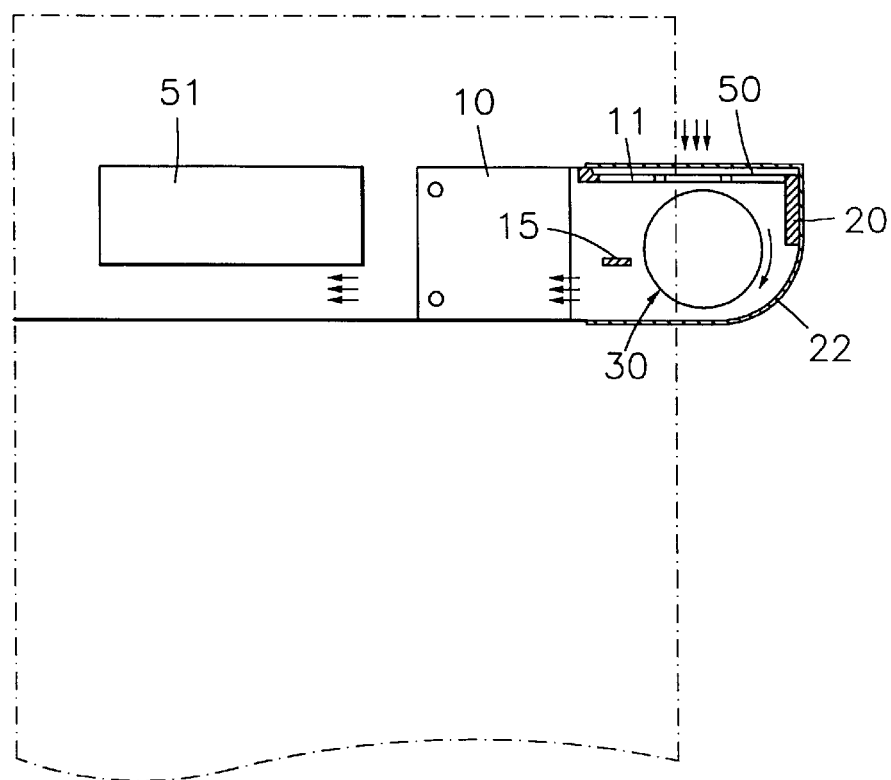
FIG. 3 is an applied view of the present invention, showing the hard disk drive cooling structure installed in a computer and operated.
Figure 6:
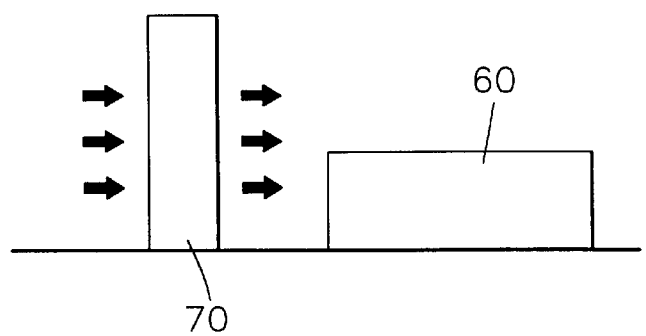
FIG. 6 is a plain view of an earlier hard disk drive cooling structure.

Referring to FIG. 3, the rack 10 is installed in a computer, having a part extended out of the housing of the computer. When the fan motor 40 is started, the tangential flow fan 30 is operated to draw outside cooling air through the air vents 21 of the fan guard 20, the wire gauze filter 50 and the air vents 11 of the rack 10 into the bottom chamber 12 of the rack 10, permitting the intake flow of air to be guided by the smoothly curved flow guide panel 22 towards the hard disk drive 51 in the computer. Therefore, heat can quickly be carried away from the hard disk drive 51 by currents of air during the operation of the tangential flow fan 30.

Figure 4:
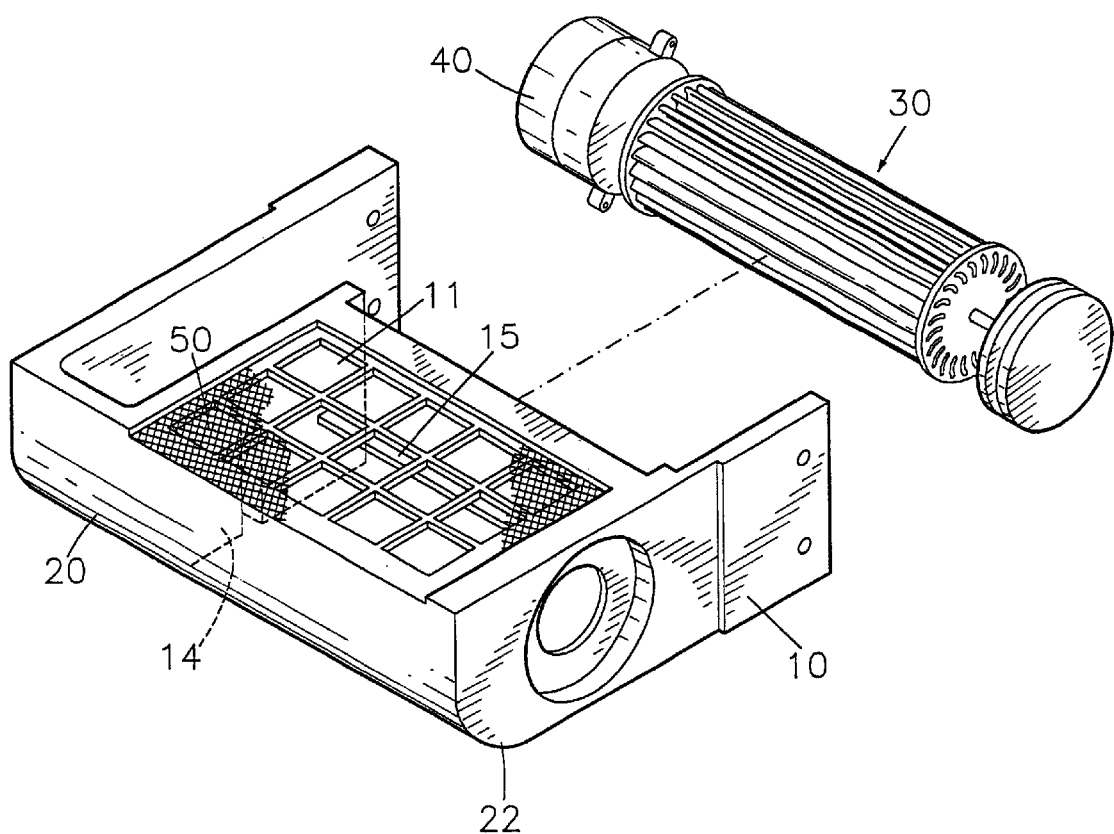
FIG. 4 is an exploded view of an alternate form of the present invention.

FIG. 4 shows an alternate form of the present invention. According to this alternate form, the fan guard 20 is integral with the rack 10.

Figure 5:
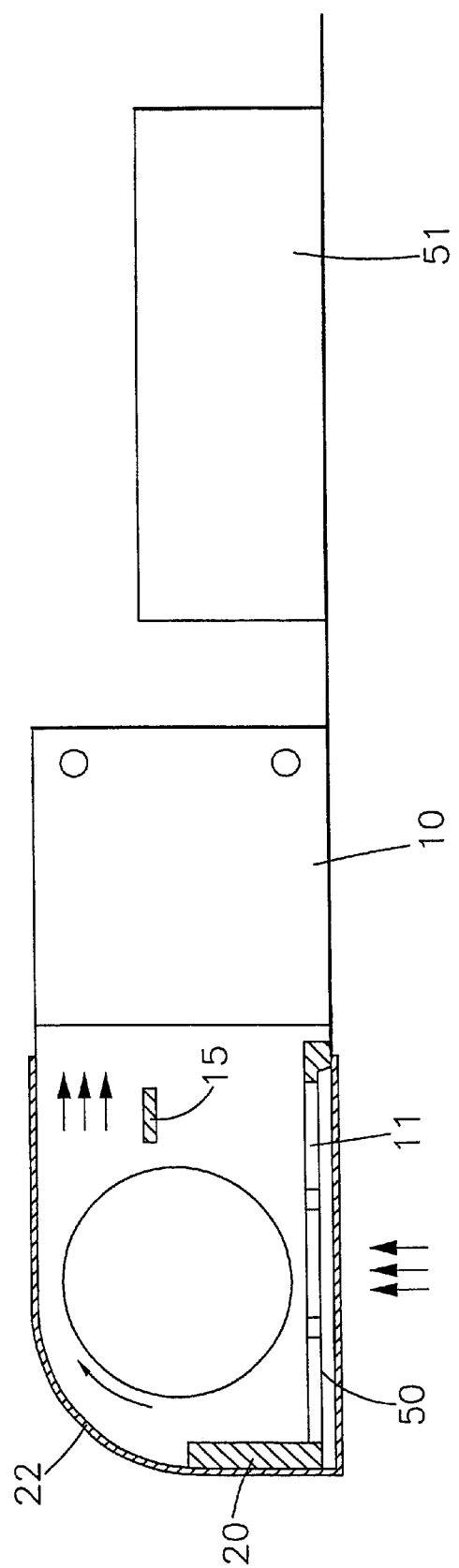
FIG. 5 is a schematic drawing showing another installation example of the present invention.

FIG. 5 shows another installation example of the present invention. According to this installation method, the rack 10 is disposed in an inverted position with the air vents 11 and the wire gauze filter 50 disposed at the bottom side and the smoothly curved flow guide panel 22 disposed at the top side. This arrangement enables currents of air to be sucked into the rack 10 from the bottom side, and then guided forwards towards the hard disk drive 51 by the flow guide panel 22 of the fan guard 20.

It is to be understood that the drawings are designed for purposes of illustration only, and are not intended as a definition of the limits and scope of the disclosed invention.

What the invention claimed is:

1. A hard disk drive cooling structure, comprising:
    a rack installed in a computer to hold a hard disk drive, said rack comprising an open chamber, which holds a fan motor and a tangential flow fan coupled to said fan motor;

a fan guard covering the open chamber of said rack, said fan guard having air vents for guiding outside air into said open chamber, and a flow guide for guiding currents of air from said air vents toward the hard disk drive carried on said rack;

wherein said open chamber is defined within said rack at a bottom side thereof, and the air vents of said fan guard are disposed in communication with and below the open chamber of said rack for permitting currents of air to be drawn into the open chamber of said rack from the bottom and then guided toward the top side of the hard disk drive.

2. The hard disk cooling structure of claim 1, wherein said fan guard is integral with said rack.

3. The hard disk cooling structure of claim 1, further comprising a wire gauze filter covering said open chamber at one side adjacent to the air vents of said fan guard.

4. The hard disk cooling structure of claim 1, wherein the flow guide of said fan guard is a smoothly curved flow guide panel extended from one end of said fan guard.

5. The hard disk cooling structure of claim 1, wherein said rack comprises a flow guide disposed between the air vents of said fan guard and said open chamber for guiding currents of air from the air vents to the flow guide of said fan guard.

6. The hard disk cooling structure of claim 1, wherein said rack has a plurality of air vents in communication between the air vents of said fan guard and said open chamber.

7. The hard disk cooling structure of claim 1, wherein said rack comprises at least one side wall, which holds said fan motor and said tangential flow fan in place.

8. A computer cooling structure, comprising:

a rack installed in a computer to hold a hard disk drive, said rack comprising an open chamber holding a fan motor and a tangential flow fan coupled to said fan motor;

a fan guard covering the open chamber of said rack, said fan guard having air vents for guiding outside air into said open chamber, and a flow guide for guiding currents of air from said air vents toward the hard disk drive carried on said rack;

said open chamber being defined within said rack at a top side thereof, and the air vents of said fan guard are disposed in communication with and above the open chamber of said rack while permitting currents of air to be drawn into the open chamber of said rack from the top and guiding the currents toward the bottom side of the hard disk drive.

9. The computer cooling structure of claim 8, wherein said fan guard is on integral structural component of said rack.

10. The computer cooling structure of claim 8, further comprising a wire gauze filter covering said open chamber at one side adjacent to the air vents of said fan guard.

11. The computer cooling structure of claim 8, wherein the flow guide of said fan guard is a smoothly curved flow guide panel extended from one end of said fan guard.

12. The computer cooling structure of claim 8, wherein said rack comprises a flow guide disposed between the air vents of said fan guard and said open chamber while guiding currents of air from the air vents to the flow guide of said fan guard.

13. The computer cooling structure of claim 8, wherein said rack has a plurality of air vents in communication between the air vents of said fan guard and said open chamber.

14. The computer cooling structure of claim 8, wherein said rack comprises at least one side wall holding said fan motor and said tangential flow fan in place.

15. A computer cooling structure, comprising:

a rack installed in a computer to hold an electronic component, said rack comprising an open chamber, said rack holding a fan motor and a tangential flow fan coupled to said fan motor;

a fan guard covering the open chamber of said rack, said fan guard having air vents for guiding outside air into said open chamber, and a flow guide guiding currents of air from said air vents toward the electronic component carried on said rack;

said open chamber being defined within said rack at a bottom side thereof, and the air vents of said fan guard being disposed in communication with and below the open chamber of said rack while permitting currents of air to be drawn into the open chamber of said rack from the bottom and then guided toward the top side of the electronic component.

16. The cooling structure of claim 15, wherein said fan guard is integral with said rack.

17. The cooling structure of claim 15, further comprising a wire gauze filter covering said open chamber at one side adjacent to the air vents of said fan guard.

18. The cooling structure of claim 15, wherein the flow guide of said fan guard is a smoothly curved flow guide panel extended from one end of said fan guard.

19. The cooling structure of claim 15, wherein said rack comprises a flow guide disposed between the air vents of said fan guard and said open chamber while guiding currents of air from the air vents to the flow guide of said fan guard.

20. The cooling structure of claim 15, wherein said rack has a plurality of air vents in communication between the air vents of said fan guard and said open chamber.

21. The cooling structure of claim 15, wherein said rack comprises at least one side wall holding said fan motor and said tangential flow fan in place.

22. A computer cooling structure, comprising:

a rack installed in a computer to hold an electronic component, said rack comprising an open chamber holding a fan motor and a tangential flow fan coupled to said fan motor;

a fan guard covering the open chamber of said rack, said fan guard having air vents for guiding outside air into said open chamber, and a flow guide guiding currents of air from said air vents toward the hard disk drive carried on said rack;

said open chamber being defined within said rack at a top side thereof, and the air vents of said fan guard being disposed in communication with and above the open chamber of said rack while permitting currents of air to be drawn into the open chamber of said rack from the top and then guided toward the bottom side of the hard disk drive.

23. The cooling structure of claim 22, wherein said fan guard is integral with said rack.

24. The cooling structure of claim 22, further comprising a wire gauze filter covering said open chamber at one side adjacent to the air vents of said fan guard.

25. The cooling structure of claim 22, wherein the flow guide of said fan guard is a smoothly curved flow guide panel extended from one end of said fan guard.

26. The cooling structure of claim 22, wherein said rack comprises a flow guide disposed between the air vents of said fan guard and said open chamber for guiding currents of air from the air vents to the flow guide of said fan guard.

27. The cooling structure of claim 22, wherein said rack has a plurality of air vents in communication between the air vents of said fan guard and said open chamber.

28. The cooling structure of claim 22, wherein said rack comprises at least one side wall holding said fan motor and said tangential flow fan in place.

\* \* \* \* \*